United States Patent [19]
Chen et al.

[11] Patent Number: 5,088,795
[45] Date of Patent: Feb. 18, 1992

[54] DUMPING TRAILER AND TRUCK FOR A CONTAINER

[76] Inventors: Junny Chen, No. 6-1, I Shin 2nd Rd.; Charles Chen, No. 18, Lane 13 Tai-Leu, Chyan Jenn Dist., both of Kaoshiung, Taiwan

[21] Appl. No.: 520,803

[22] Filed: May 8, 1990

[51] Int. Cl.⁵ .............................................. B60P 1/64
[52] U.S. Cl. .................................. 298/22 J; 410/82; 410/84; 410/90
[58] Field of Search ................ 410/46, 81, 82, 83, 410/84, 90, 91; 414/498; 298/22 J

[56] References Cited
U.S. PATENT DOCUMENTS

| | | | |
|---|---|---|---|
| 2,527,369 | 10/1950 | Meyer | 414/498 X |
| 3,193,238 | 7/1965 | Sherrie | 410/82 |
| 4,013,017 | 3/1977 | Toyota et al. | 410/83 X |
| 4,352,613 | 10/1982 | Bertolini | 410/82 |
| 4,354,707 | 10/1982 | Jones | 410/82 |

*Primary Examiner*—Robert J. Spar
*Assistant Examiner*—Janice Krizek
*Attorney, Agent, or Firm*—Fleit, Jacobson, Cohn, Price, Holman & Stern

[57] ABSTRACT

A dumping trailer and truck for containers has a frame for mounting and keeping firmly a container thereon and an oil pressure cylinder possible to raise the frame inclinedly with its front up so shock-enduring goods such as scrap, grain, etc., can be loaded in a container inclinedly raised up through an opening at the front or unloaded from a container inclinedly raised up through an opening at the rear.

1 Claim, 6 Drawing Sheets

DUMPING TRAILER AND TRUCK FOR A CONTAINER

BACKGROUND OF THE INVENTION

For more than a decade flatbed trailers for containers have played an important role in transportation. Containers are sized uniformly and hoisted onto or down flatbed trailers by cranes without manual work, and with much convenience. But the most important thing in the hoisting process is that the goods or products put in containers should not be moved or collide with one another. Besides, goods that can endure shocks such as mineral ore, scrap, coal, grain, etc. have to be loaded or unloaded with manual work. For example, one container for loading 22 tons of aluminum scrap needs 10 hours by 5 workers and a lift truck and for unloading the same takes 8 hours by 3 workers and a lift truck. This kind of loading and unloading method not merely wastes man power but time, to the result of inconvenience and being uneconomical.

SUMMARY OF THE INVENTION

In view of the disadvantage of traditional dumping trailers and trucks for containers, especially for those to transport shock-enduring goods like scrap, mineral ore, coal, etc., this invention has been devised to furnish a dumping trailer and truck possible to load a container in 15 minutes by a driver with help of a lift truck or to unload it in less than a minute by a driver.

The dumping trailer and truck for a container in the present invention comprises a flat frame for a container to mount on and an oil pressure cylinder to raise the frame with its front up and its rear connected with the trailer body functioning as a fulcrum. Thus, the container can be raised up to an incline together with the frame for loading shock-enduring goods such as scrap, grain, etc. therein through an opening at the front of the container or unloading the goods through an opening at the rear, saving man power and time in loading or unloading a container.

The flat frame is provided at four corners with a projecting rectangular block extending up from a worm gear engaging with a worm at the end of a shaft rotated by an air pressure cylinder fixed respectively under both lengthwise sides of the frame. The four rectangular blocks can engage with the four rectangular holes at the four corners of the bottom of a container and be rotated for 90° in the holes so that the longer sides of the blocks cross the shorter sides of the holes to keep the container mounted on the frame immovable, in other words, unable to slide down off the frame even when the container is raised up to an incline together with the frame by the oil pressure cylinder.

The oil pressure cylinder is provided under the middle section of the frame, supported by a comparatively large post in the trailer body, and having its piston rod extensible to push up two arms connected with the back side of the frame. The rear end of the frame is connected with the trailer body so that when the frame is raised up by the oil pressure cylinder it can become gradually inclined with its front up and with its rear end functioning as a fulcrum.

When a container is to load shock-enduring goods such as ore, grain, etc., it is raised up to an incline together with the frame by operating the oil pressure cylinder, having its opening at the front, through which the goods can be poured down therein with help of a lift truck and automatically slides down to the rear of the container by its own weight. On the contrary, in unloading a container, it is raised up inclinedly with its opening at the rear so that the goods can slide out of the container by its own weight without any manual work and besides, in a very short time less than a minute.

BRIEF DESCRIPTION OF THE DRAWINGS

This invention will now be described in detail with reference to accompanying drawings wherein.

DETAILED DESCRIPTION OF THE INVENTION

Figure 3:
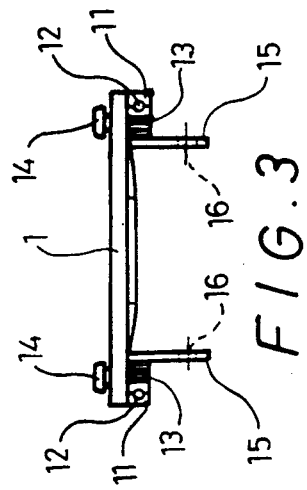
FIG. 3 is a side view of the frame.
Figure 1:
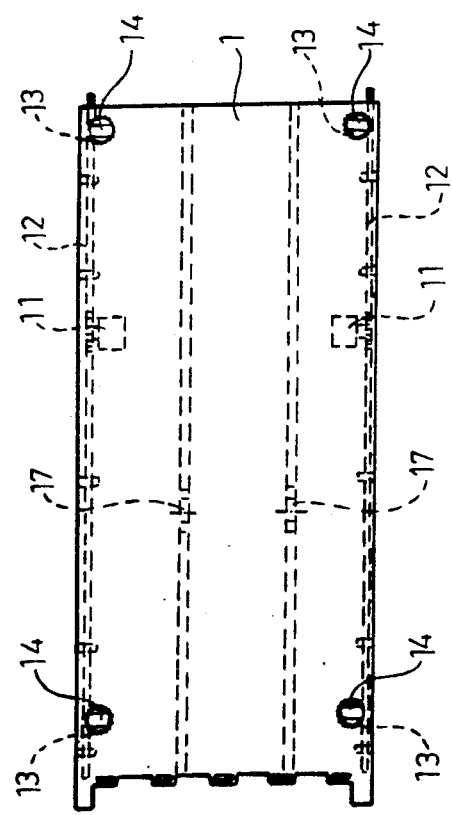
FIG. 1 is a plan view of the frame of the present invention.
Figure 2:
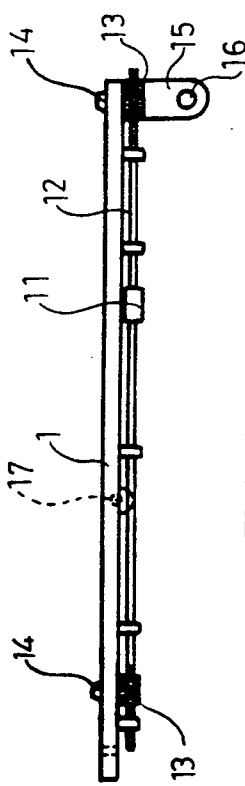
FIG. 2 is a front view of the frame.

The dumping trailer of the present invention, such as is shown in FIGS. 1, 2, and 3, comprises a frame 1 mounted on the trailer body and made of metal, two air pressure cylinders 11 respectively provided under the frame 1 at opposite lengthwise sides, two shafts 12 connected with and revolved by the air pressure cylinders 11 and having a worm at the end to engage with a worm gear 13 having a projecting rectangular block 14 vertically extending up from the worm gear 13 and revolving synchronously with the gear 13. The blocks 14 are fixed at the four corners of the frame 1 and can engage in rectangular holes in a container 2 as shown in FIGS. 7 and 8.

Figure 4:
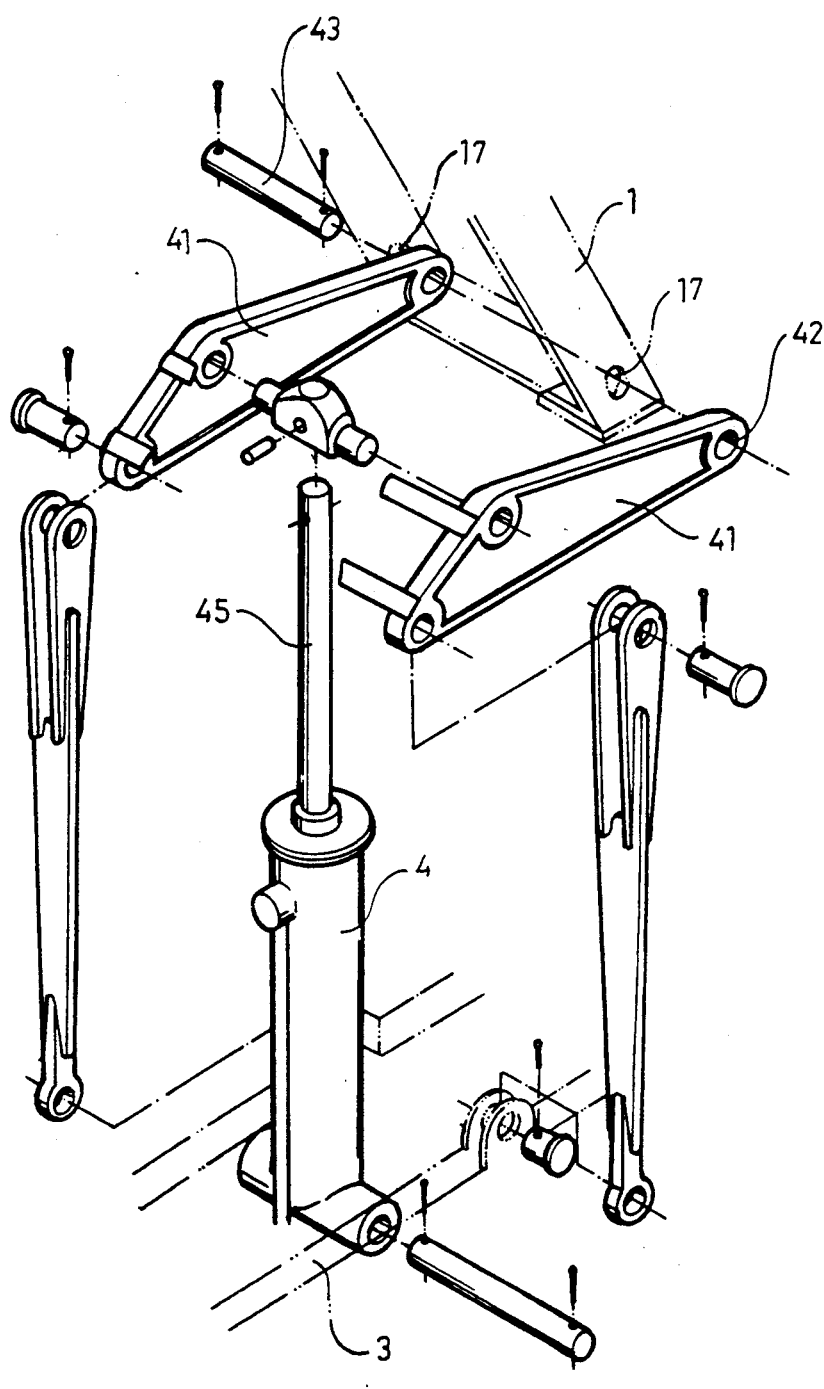
FIG. 4 is an exploded perspective view of the oil pressure cylinder of the present invention.
Figure 5:
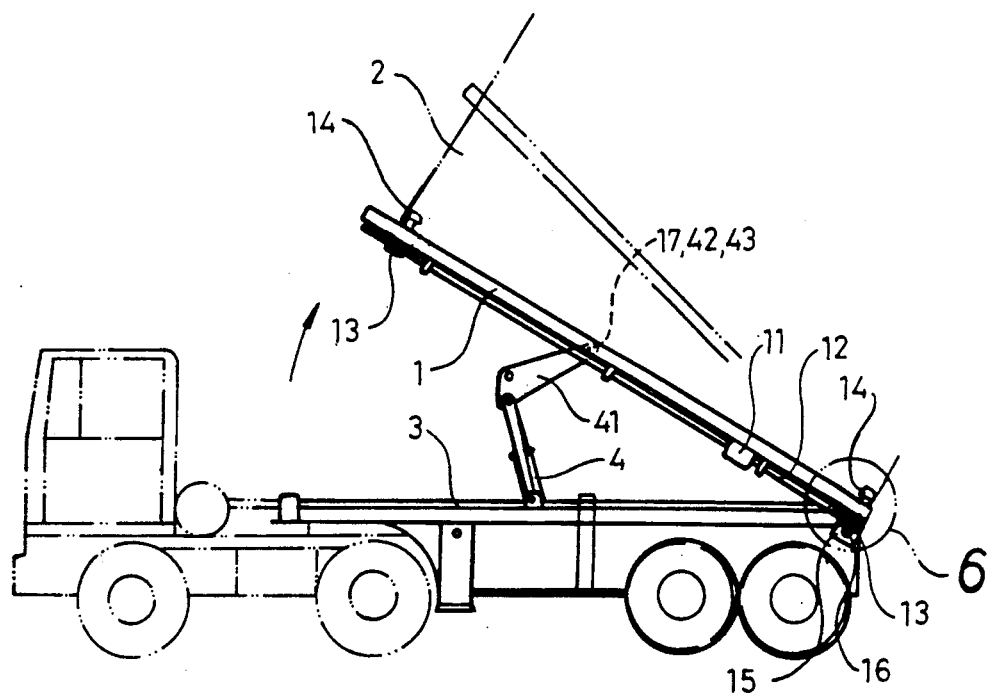
FIG. 5 is an action view of the oil pressure cylinder raising the frame in the present invention.
Figure 6:
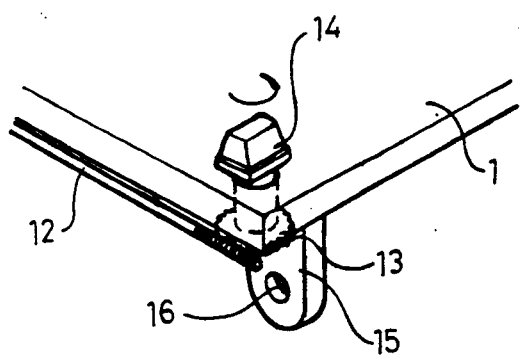
FIG. 6 is a partial englarged view of the frame in the present invention.

An oil presure cylinder 4, as shown in FIG. 4, is provided at nearly the middle section of the trailer body 3, having an extensible piston rod 45 and two arms 41 connected at the end of the piston rod 45. The arms 41 have holes 42 for both ends of a rod 43 to be inserted and to be kept therein with a bolt. The rod 43 also inserts through a hole 17 in the frame 1, and thereby the arms 41 are combined with the frame 1 so that the piston rod 45 can be extended upward to move the arms 41 also upward for raising the frame 1.

As shown in FIG. 2, a downwardly protruding ear 15 is respectively provided at both rear lengthwise ends, having a shaft hole 16 for a shaft to pass through so as to combine the frame 1 with the trailer body 3. Thus, when the frame is raised up by the oil pressure cylinder 4, the shaft functions as a fulcrum, making the frame 1 be raised up with the front up and the rear kept immovable by the ears 15 and the shaft.

Figure 7:
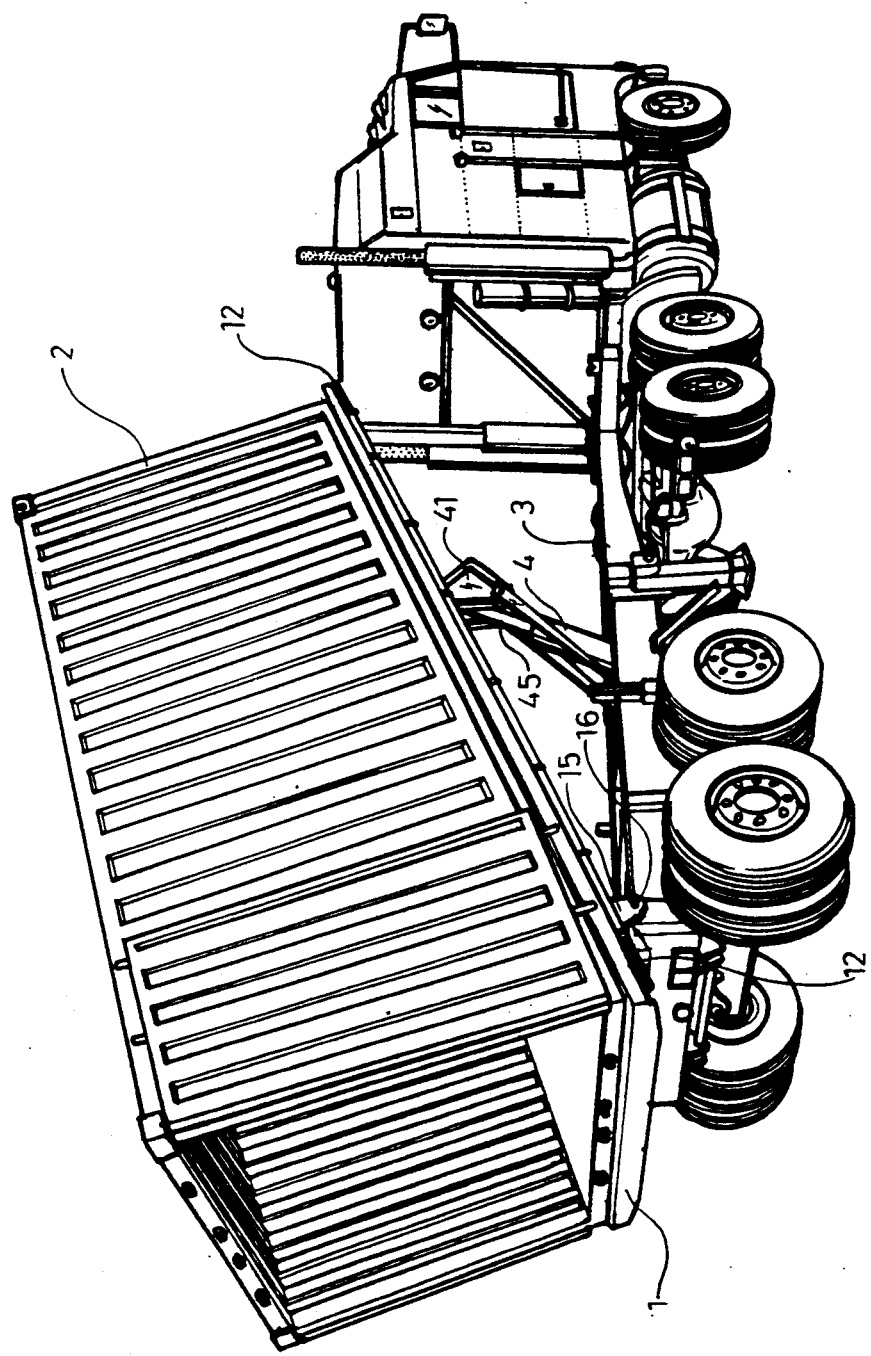
FIG. 7 is a perspective view of a first embodiment dumping trailer and truck for containers in the present invention.
Figure 8:
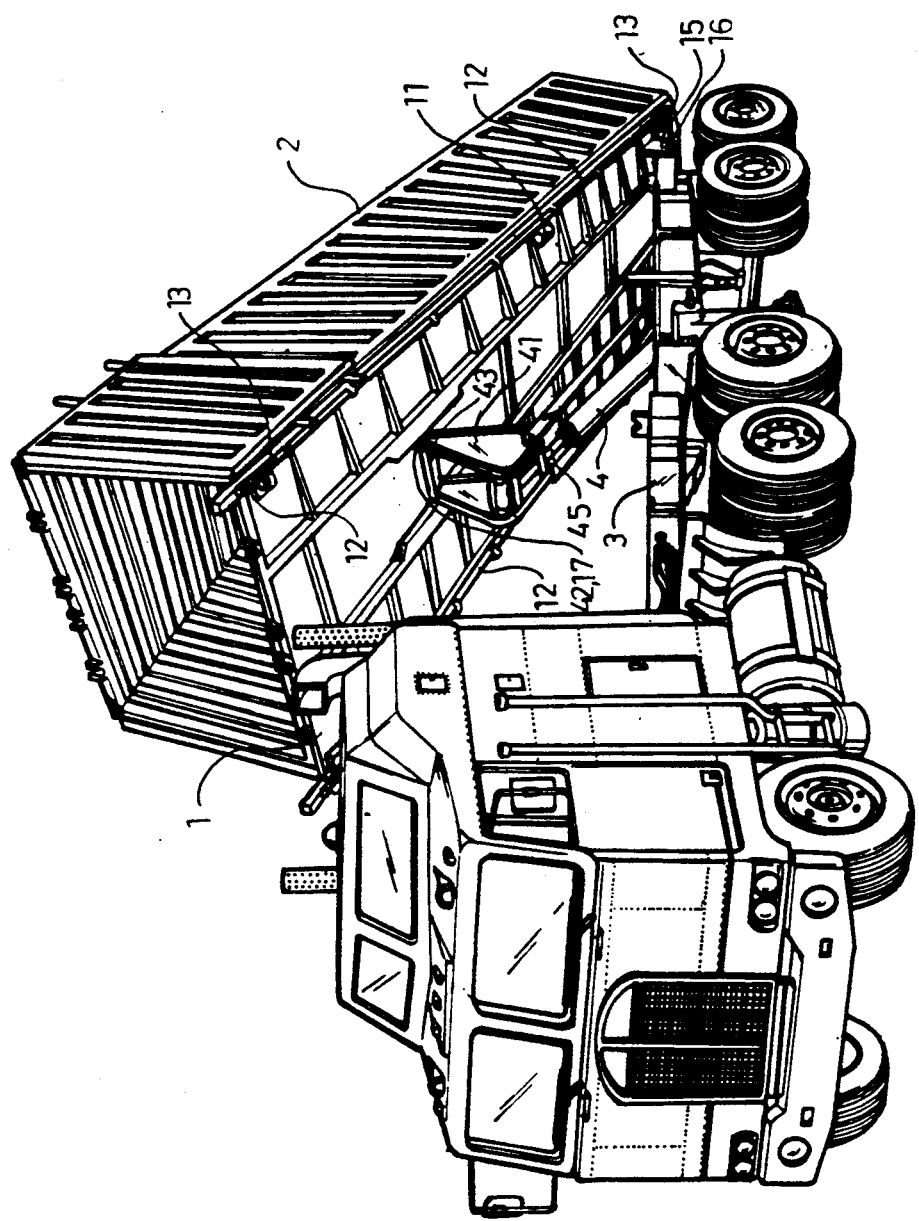
FIG. 8 is a perspective view of a second embodiment dumping trailer and truck for containers in the present invention.

When a container is to be hoisted up and placed by a crane on the frame 1, the opening of the container should be at the rear as shown in FIG. 7 or at the front as shown in FIG. 8. In addition, the four rectangular holes provided at the four corners of the bottom of the container have to be engaged with the four projecting blocks 14 at the four corners of the frame 1 and the blocks 14 then have to be rotated through 90° to make the longer sides of the blocks 14 to cross the shorter sides of the holes 21 so that the container and the frame 1 are firmly kept together and the container can be kept immovable without sliding down off the frame 1 when the frame 1 is raised up to an incline by the oil pressure cylinder for unloading the contents of the container. The conventional container uses a pin instead of the block 14 at every corner.

FIG. 7 shows a container 2 with its opening at the rear is raised up to an incline with the front up so that the contents such as scrap in the container can be quickly unloaded.

FIG. 8 shows a container 2 with its opening at the front is raised up to an incline with the front up so that scrap or the like can be quickly loaded in the container 2 with help of a lift truck, sliding down the rear interior of the container 2 automatically by its own weight, with the result of saving man power and time.

Figure 9:
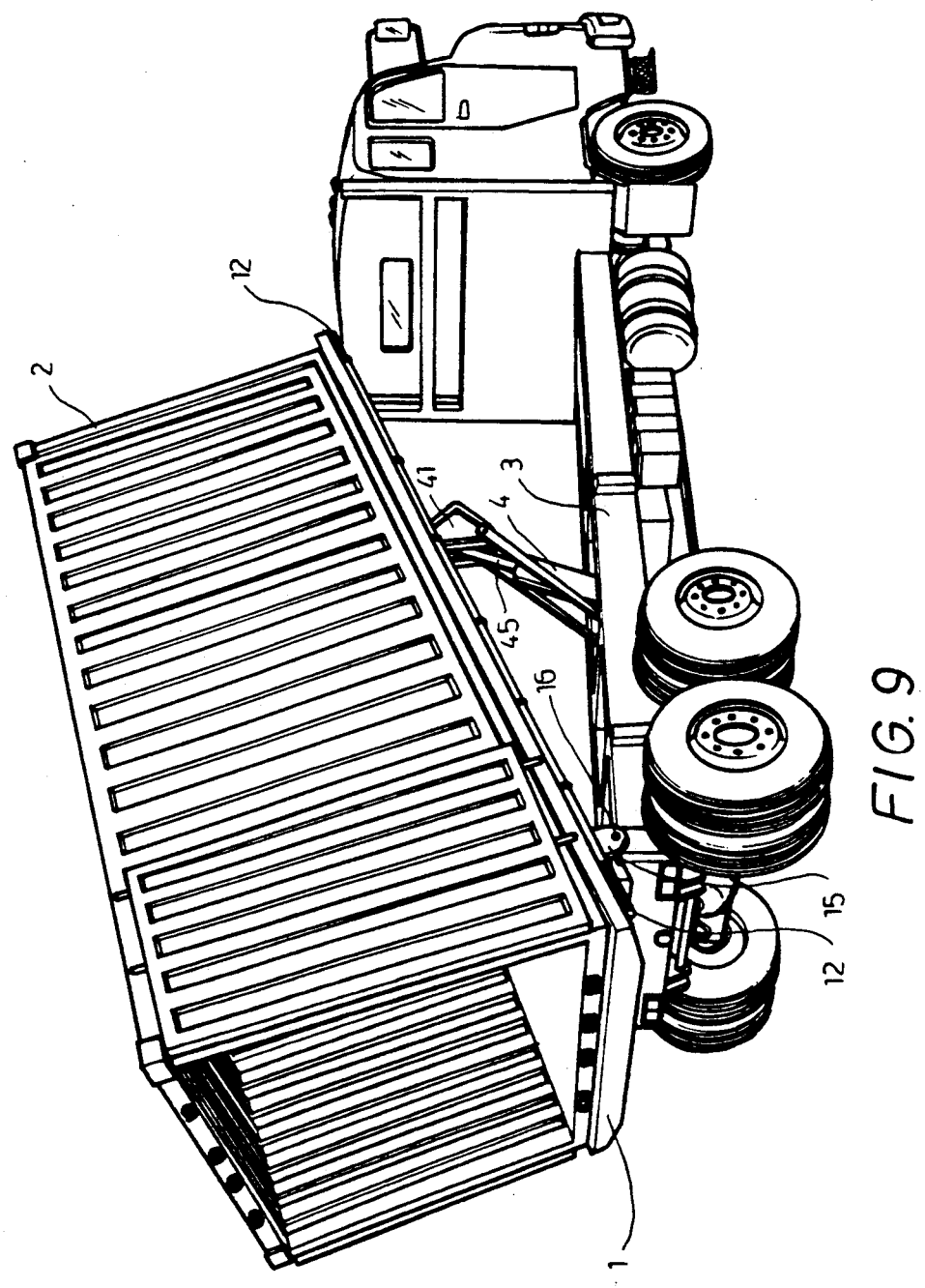
FIG. 9 is a perspective view of a third embodiment dumping trailer and truck for containers in the present invention.

FIG. 9 shows that a container is used on the truck.

In summary, loading a container carried on the dumping trailer and truck in accordance with the present invention may take only fifteen minutes or so and unloading a container on said trailer may take less than twenty seconds, a rapid speed to save man power and time.

What is claimed is:

1. A dumping trailer and truck for containers comprising:
    a container having a bottom surface and a rectangular hole in each of for corners of the bottom surface;
    a frame made of metal for mounting and keeping firmly said container thereon;
    a trailer body;
    two air pressure cylinders being provided under the frame at both the lengthwise sides, having a rotatable lengthwise extending shaft having on both front and rear ends a worm to engage with a worm gear having a rectangular block vertically extending up from said gear, said block being insertable in one of said rectangular holes of said container;
    two downwardly protruding ears being provided respectively at both rear lengthwise sides of the frame, having a shaft hole for a fulcrum shaft to pass through so as to combine the frame with the trailer body; and
    an oil pressure cylinder being provided at nearly the middle section of the trailer body, having an extensible piston rod and two arms connected at the end of the piston rod, the arms having a hole at their ends for a rod to be inserted and kept therein with a bolt to combine the arms with the frame by means of the rod which also passes through a hole in the frame, the piston rod of said pressure cylinder being extendable to lift the arms combined with the frame so that the front of the frame can be inclinedly raised up and pivoted about the fulcrum shaft.

* * * * *